United States Patent Office 2,975,265
Patented Mar. 14, 1961

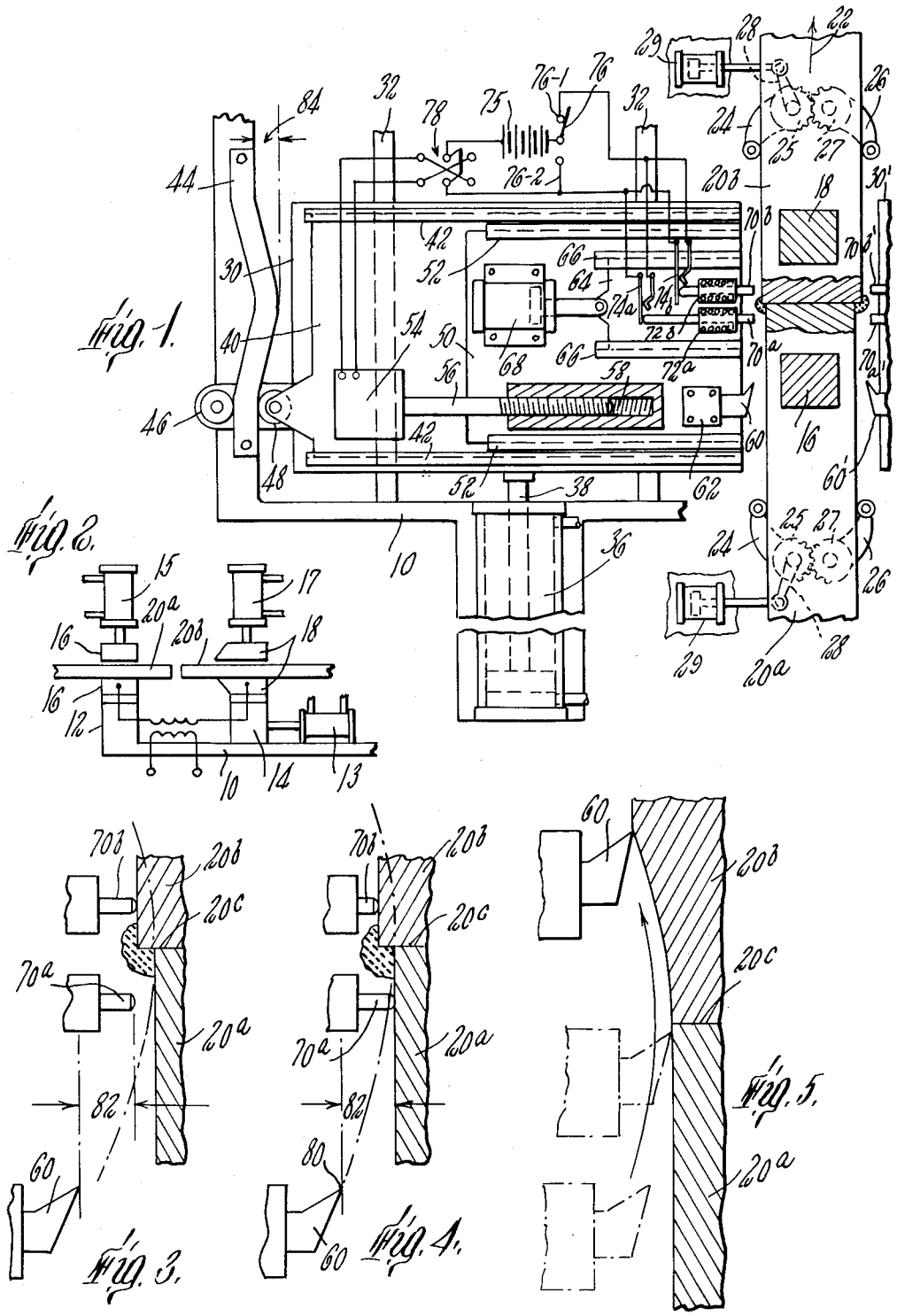

2,975,265

EDGE TRIMMING WELDING MACHINE

Walter S. Kaiser, Wakefield, and Hermann W. Stieglitz, Marblehead, Mass., assignors to Seton Corporation, Providence, R.I., a corporation of Delaware Filed May 3, 1960, Ser. No. 26,469

9 Claims. (Cl. 219—97)

This invention relates to flash butt welding machines and more particularly to such machines incorporating means for side edge trimming welded workpieces smoothly to merge even offset side edge discontinuities as when one edge of a welded workpiece is substantially offset from the adjacent edge on the other side of the weld area.

In the flash butt welding of certain materials, notably the ends of flat steel strip material known as "scelp" to produce a continuous strip which is thereafter edge rolled into a pipe, it is necessary to provide a smooth side edge adjacent to and throughout the weld area because of the subsequent rolling operation or for other reasons. The provision of such an edge is made more difficult because of the non-uniform width, in many instances, of the ends of the workpieces to be welded, so that it becomes necessary to carry out a substantial manual grinding operation in order to provide the smooth merging. However, such a grinding operation is, both because of its manual aspects and because of its time factor, inconsistent with the manufacture, for example, of pipe from a continuous strip of "scelp," as well as for like continuous production operations.

Accordingly, it is an object of the present invention to provide a flash butt welding machine for welding the free ends of strip material to produce a continuous strip, for example, such machine having edge trimming means for trimming side edge discontinuities, such as offset edges at the weld area of such a strip smoothly to merge the side edges adjacent the welded area.

It is another object of the invention to provide means whereby the maximum discontinuity, in a direction into the body of the material, establishes the degree of merging cut, so that a minimum amount of material is removed to provide the optimum merging cut.

It is still another object of the invention to reduce the initial degree of discontinuity to the greatest extent possible.

In general, the above objects of the invention have been accomplished by providing sensing means for sensing the maximum degree of the discontinuity at the weld area and cutting means movable relatively to a curved path from an initial position spaced from the material first toward and then away from the body of the material, with the initial position of the cutting means being established by the sensing means. The initial position of the cutting means being established by the sensing means to provide a degree of penetration into the body of the material at least as great as, but preferably not substantially greater than, the maximum discontinuity, the greatest degree of penetration of the cutting means while moving along such curved path through the material will be generally at the weld area thereof for optimum merging. More specifically, for sensing offset edges of strip material, independent means are provided for simultaneously sensing the strip edges at each side of the offset discontinuity, with the initial position of the cutting means being established by the last one of said independent means to sense a strip edge. Preferably, a pair of such cutting and sensing means are provided, one for each strip edge, with the workpieces being centered relative to a common center line prior to welding to reduce the degree of offset as much as possible.

Various other objects and features of the invention will be apparent from the following description of a preferred embodiment thereof, together with the accompanying drawings, wherein:

Fig. 1 is a somewhat diagrammatic plan view of a welding machine according to the present invention;

Fig. 2 is a diagrammatic front elevation of the machine of Fig. 1 showing additional elements thereof but omitting for clarity most of the elements shown in Fig. 1; and Figs. 3–5 are enlarged diagrammatic views showing the operation of the welding machine of Figs. 1 and 2 to trim the offset edges of a welded workpiece.

Referring to Figs. 1 and 2, the welding machine has a base 10 upon which are mounted an insulated fixed platen 12 and an insulated movable platen 14. Each of the platens 12, 14 has a clamping structure 16, 18, respectively, consisting of an upper jaw and a lower jaw, for clamping the pieces of work 20a, 20b to be welded. The jaws of clamping structure 18 include shearing portions which are adapted to remove the upset metal from the upper and lower faces of the weld. The fixed clamp 16 has a single piston cylinder 15 and movable clamp 18 has a two piston cylinder 17 associated therewith for operating the clamping structures. The movable platen 14 is actuated by a hydraulic motor 13 connected directly to it or otherwise. These elements, being fully described and shown in Patent No. 2,875,319, will not be further described herein, except in connection with the present invention. In addition, centering means are also provided for each of workpieces 20a, 20b consisting of a pair of arms 24, 26 having meshing gears 25, 27 and pivotally mounted on frame 10, with one of said arms 24 having thereon a lever 28 operable by a hydraulic cylinder 29 to hold the workpieces 20a, 20b in a centered position.

In accordance with the principles of the present invention there is provided a main slide 30 mounted on frame 10 for movement in a direction parallel to the center line 22 of the welded strip by means of ways 32, a hydraulic cylinder 36 mounted on frame 10 having its piston rod 38 connected to said slide being utilized to move it as hereinafter explained. A cross slide 40 is mounted on main slide 30 by means of ways 42 for movement in a direction perpendicular thereto, said cross slide being controlled in its movement by means of a fixed cam 44 mounted on frame 10 together with cam follower rollers 46, 48 carried by cross slide 40. The cam 44 is so curved as to move cross slide 40 in a curved path toward and then away from the body of the strip as main slide 30 is traversed by its cylinder 36. An adjustable cross slide 50 is in turn mounted on cross slide 40 by means of ways 52. An electric gear motor 54 is mounted on cross slide 40 for adjusting the position of cross slide 50 by rotating a threaded member 56 cooperating with a threaded bore 58 in cross slide 50.

The cross slide 50 carries a cutter 60 mounted in a suitable holder 62, as well as a sensing device mounted on a slide 64 in ways 66 for transverse movement on adjustable cross slide 50. A hydraulic cylinder 68 is provided on adjustable cross slide 50 for moving sensing device slide 64 from its operative position as shown in Fig. 1 to a retracted position away from the workpieces 20a, 20b. The sensing device includes a pair of independent means for sensing the strip edges 20a, 20b, in the form of plungers 70a and 70b urged forward by associated springs 72a, 72b to a predetermined position as shown in Fig. 1, said plungers opening their associated normally closed switches 74a, 74b when moved rearwardly against spring pressure upon contact with the workpieces 20a, 20b. The switches 74a, 74b are arranged in parallel circuit so that battery 75 will drive motor 54 to advance cross slide 50 when function switch arm 76 is connected to its terminal 76–1 and reversing switch 78 is appropriately closed.

The entire above described side edge trimming means is duplicated on the opposite side of the strip workpieces 20a, 20b, portions thereof being shown in Fig. 1 and having identical reference numerals with prime marks applied thereto.

In operation, after the welding of the centered workpieces has been completed and with the elements of the welding machine otherwise as shown in Fig. 1, reversing switch 78 is connected so that motor 54 will move adjustable cross slide 50 in a direction toward the workpieces 20a, 20b and function switch 76 is connected to its terminal 76–1. This will cause motor 54 to move adjustable cross slide 50 toward the welded strip workpieces 20a, 20b, since switches 74a, 74b are both closed. As the slide 50 continues to move, one of the plungers will first contact the furthest offset edge, shown in Fig. 3 as the edge of workpiece 20b being contacted by plunger 70b. Switch 74b will thereupon be opened, but, since switches 74a, 74b are in parallel circuit, current will continue to flow through switch 74a to continue to advance adjustable cross slide 50.

However, when the other plunger 70a contacts the workpiece 20a (Fig. 4) to open its switch 74a, the advance of cross slide 50 will stop since current will then be cut off from motor 54. This will establish the initial position 80 of the point of cutter 60 to provide a degree of penetration into the body of the workpieces 20a, 20b at least as great as the surface of the edge of workpiece 20a, as sensed by plunger 70a. If desired, a somewhat advanced initial position may be provided by decreasing the transverse spacing 82 between the cutter point and the furthest advanced plungers 70a, 70b, such spacing being, for minimum material removal, equal to the spacing 84 representing the maximum displacement of the surface of the cam 44 which defines the curved path of cutter movement, when the maximum displacement of said curve at its greatest degree of penetration into the body of the workpiece is at the least offset thereof, at the surface of workpiece 20a as herein shown.

With cutter 60 so adjusted as shown in Fig. 4 by means of its workpiece holder 62, function switch 76 is opened and the sensing plungers 70a, 70b retracted in preparation for the cutting stroke by operating cylinder 68 to move slide 64 away from the workpiece. The main slide cylinder 36 is then operated to move main slide 30 throughout its stroke. During such movement, cam 44 causes cross slide 40 carrying cross slide 50 in its adjusted position to move cutter 60 in a curved path from its initial position toward and then away from the body of workpieces 20a, 20b with the greatest degree of penetration of the cutter being at the weld line 20c (Fig. 5). After completion, cylinder 36 may be operated to reverse the movement of slide 30, motor 54 may be operated through its reversing switch 78 and its function switch 76 connected to its terminal 76–2, and sensing device cylinder 68 may be operated to once again advance the sensing device. It is understood that, during the above described operation, workpieces 20a, 20b remained clamped in clamps 16, 18 and that a similar operation may simultaneously be carried out by sensing plungers 70a', 70b' and cutter 60' on the opposite side edge of workpieces 20a, 20b. Such simultaneous operation causes a smoothly merged edge to be produced with a minimum of material removal on each side of the strip material. The clamps 16, 18 may thereafter be operated to shear the upset metal from the upper and lower strip surfaces in the usual manner and opened to release the work.

It will be understood that various modifications may be made of the preferred apparatus described herein within the spirit of the invention and the scope of the appended claims. For example, a centering and welding step may be carried out at a separate location than that of the trimming step herein described, with the workpiece thereafter being advanced to a trimming location wherein its weld line is centered between the sensing plungers and then clamped to hold it for sensing and trimming in accordance with the invention. Again, but a single sensing and cutting mechanism may be used, with the opposite strip edges alined to lie in a straight line. Still other modifications will occur to those skilled in the welding art.

We claim:

1. In apparatus for flash butt welding the free ends of material, means for trimming side edge discontinuities in said material including clamp means for holding welded material, sensing means for sensing the maximum degree of a discontinuity of the welded side edges of said material, cutting means for cutting the side edges at said discontinuity smoothly to merge the edges of the material adjacent the weld area thereof, said cutting means being movable relatively to said material in a curved path from an initial position spaced from the material first toward and then away from the body of said material with the greatest degree of penetration of said cutting means while moving along said path through said material being adjacent the weld area thereof, the initial position of said cutting means being established by said sensing means to provide a degree of penetration into the body of said material at least as great as the maximum discontinuity thereof as sensed by said sensing means.

2. In apparatus for flash butt welding the free ends of strip material, means for trimming offset side edge discontinuities at the weld area smoothly to merge the side edges of welded strips including clamp means for holding the welded strip material, sensing means for sensing the maximum degree of offset discontinuity of the welded side edges of the strip material, cutting means for cutting the side edges at said offset to merge the edges of said strip material, said cutting means being movable relatively to said strip material in a curved path from an initial position spaced from the material first toward and then away from the body of said material with the greatest degree of penetration of said cutting means while moving along said path through said material being at the weld thereof, the initial position of said cutting means being established by said sensing means to provide a degree of penetration into the body of said strip material at least as great as the maximum offset thereof as sensed by said sensing means.

3. In apparatus as claimed in claim 2 wherein said sensing means includes independent means for simultaneously sensing the strip edges at each side of said offset discontinuity, and means for advancing said independent means toward the body of said strip, the last one of said independent means to sense a strip edge being operable to position said cutting means.

4. In apparatus as claimed in claim 3, further including means for retracting said sensing means to a position clear of said strip during movement of said cutting means along said path.

5. In apparatus as claimed in claim 3 wherein said cutting means advances to said initial position simultaneously with the advance of the last one of said independent means to sense a strip edge.

6. In apparatus as claimed in claim 3 wherein cam means are provided to establish said curved path.

7. Apparatus for flash butt welding the free ends of strip material of differing width including centering means for centering the strips to be welded relative to a common line of alinement, clamp means for welding the strip ends, slide means movable toward and away from said strip material, sensing means mounted on said slide means for sensing the maximum degree of offset discontinuity of the welded strip side edges, said sensing means having independent means for simultaneously sensing the strip edges at each side of said offset discontinuity, and means for retracting said sensing means, cutting means mounted on said slide means for cutting the side edges at said offset smoothly to merge said edges, said cutting means being movable with said slide means to an initial position spaced from the material and then movable by means independent of said slide means in a curved path from said initial position toward and then away from the body of said material with the greatest degree of penetration of said cutting means while moving along said path through said material being at the weld thereof, the initial position of said cutting means being established by said sensing means by arresting the advance of said slide means to provide a degree of penetration into the body of said strip material at least as great as the maximum offset thereof as sensed by the last one of said independent means to sense a strip edge.

8. Apparatus as claimed in claim 7 wherein said means for moving said cutting means along said curved path includes cam means establishing said path and means for moving said slide relatively to said cam means in a direction along said strip material.

9. Apparatus for flash butt welding the free ends of strip material of differing width including centering means for centering the strips to be welded relative to a common center line, clamp means for welding the strip ends, a pair of opposed slide means movable toward and away from said strip material, sensing means mounted on each of said slide means for sensing the maximum degree of offset discontinuity of each of the welded strip side edges, said sensing means having independent means for simultaneously sensing the strip edges at each side of said offset discontinuity, and means for retracting said sensing means, cutting means mounted on each of said slide means for cutting the side edges at said offset smoothly to merge said edges, said cutting means being movable with its slide means to an initial position spaced from the material and then movable by means independent of said slide means in a curved path from said initial position toward and then away from the body of said material with the greatest degree of penetration of said cutting means while moving along said path through said material being at the weld thereof, the initial position of said cutting means being established by said sensing means by arresting the advance of said slide means to provide a degree of penetration into the body of said strip material at least as great as the maximum offset thereof as sensed by the last one of said independent means to sense a strip edge.

References Cited in the file of this patent

UNITED STATES PATENTS

| | | |
|---|---|---|
| 2,177,356 | Stone et al. | Oct. 24, 1939 |
| 2,257,132 | Schoenky | Sept. 30, 1941 |
| 2,314,656 | Morton | Mar. 23, 1943 |
| 2,404,180 | King et al. | July 16, 1946 |
| 2,875,319 | Stieglitz | Feb. 24, 1959 |